(12) United States Patent
Chen et al.

(10) Patent No.: US 10,197,726 B2
(45) Date of Patent: Feb. 5, 2019

(54) WIDE-BAND MULTIMODE OPTICAL FIBERS WITH CORES HAVING A RADIALLY-DEPENDENT ALPHA PROFILE

(71) Applicant: Corning Incorporated, Corning, NY (US)

(72) Inventors: Xin Chen, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/010,834

(22) Filed: Jun. 18, 2018

(65) Prior Publication Data

US 2018/0372947 A1    Dec. 27, 2018

Related U.S. Application Data

(60) Provisional application No. 62/523,320, filed on Jun. 22, 2017.

(51) Int. Cl.
  *G02B 6/36* (2006.01)
  *G02B 6/028* (2006.01)
  *G02B 6/036* (2006.01)
  *G02B 6/02* (2006.01)

(52) U.S. Cl.
  CPC ....... *G02B 6/0288* (2013.01); *G02B 6/02214* (2013.01); *G02B 6/0365* (2013.01)

(58) Field of Classification Search
  CPC . G02B 6/02214; G02B 6/0288; G02B 6/0365
  See application file for complete search history.

(56) References Cited

U.S. PATENT DOCUMENTS

| | | | | |
|---|---|---|---|---|
| 6,317,549 B1 * | 11/2001 | Brown | .................... | C03C 13/04 385/123 |
| 6,339,432 B1 * | 1/2002 | Grossman | .............. | G09G 5/026 345/637 |
| 6,466,721 B1 * | 10/2002 | Tsukitani | ........... | G02B 6/02019 385/127 |
| 7,421,174 B2 * | 9/2008 | Fleming, Jr. | ....... | G02B 6/03627 385/123 |
| 7,844,155 B2 * | 11/2010 | Bickham | ............ | G02B 6/02333 385/126 |
| 8,391,661 B2 * | 3/2013 | Molin | .................. | G02B 6/0288 385/124 |

(Continued)

FOREIGN PATENT DOCUMENTS

WO    2000050936 A1    8/2000
WO    2013066961 A1    5/2013

OTHER PUBLICATIONS

Adrian Amezcua, Denis Molin, (Prysmian Group), Paul Kolesar, Rich Baca (Commscope), "Wide Band MMF Bandwidth Requirements", TR-42.11 Wide Band MMF Project Proposal (2014); 15 Pages.

(Continued)

*Primary Examiner* — Akm Enayet Ullah
(74) *Attorney, Agent, or Firm* — Robert L. Carlson (57) ABSTRACT

A multimode optical fiber includes a core region in having silica and an outer radius, R. A cladding of the fiber surrounds the core region and includes silica. The core region has a refractive index profile with a radially-dependent alpha. The radially-dependent alpha is given by $\alpha(r)=f(r)$.

24 Claims, 6 Drawing Sheets

(56) References Cited

U.S. PATENT DOCUMENTS

| | | | | |
|---|---|---|---|---|
| 8,542,967 B2* | 9/2013 | Gooijer | ............... | G02B 6/0281 385/124 |
| 8,971,683 B2 | 3/2015 | Chen et al. | | |
| 9,021,316 B2* | 4/2015 | Bancel | ............... | G06F 11/0751 711/155 |
| 9,802,858 B2* | 10/2017 | Bookbinder | .............. | C03C 3/06 |
| 9,835,796 B2* | 12/2017 | Bigot | ................... | G02B 6/0288 |
| 9,857,529 B2* | 1/2018 | Wood | ................... | G02B 6/0288 |
| 9,995,873 B2* | 6/2018 | Bickham | .............. | G02B 6/0365 |
| 10,048,437 B2* | 8/2018 | Morita | ............... | G02B 6/03666 |

OTHER PUBLICATIONS

Molin et al; "Wideband OM4 Multimode Fiber for Next-Generation 400GBPS Data Communications"; ECOC 2014, Cannes France; 3 Pages.

Paul Kolesar, (OFS) Rich Baca, Roman Shubochkin, Dave Mazzarese, (Commscope) Jonathan King, Jim Tatum, (FINISAR), "Wide Band MMF", TR42.11, TR-42.12 (2014) 19 Pages.

Petermann; "A Generalized Condition for the Delay Equalization in Multimode Optical Fibres"; Proc. 4TH European Conference on Optical Communication; 1978; 7 Pages.

Petermann, K., "Simple Relationship Between Differential Mode Delay in Optical Fibres and the Deviation From Optimum Profile"; Elect. Lett. 14, (1978) 14, p. 793.

Stone et al; "The Use of a Quantitative Differential Mode Delay Technique to Improve Fiber Bandwidth"; J. Lightwave Tech. 1 (1983) 4, p. 585.

Bigot et al. "Extra-wide-band OM4 MMF for future 1.6Tbps data communications" 2015 Optical Fiber Communications Conference and Exhibition (OFC), Mar. 2015. pp. 1-3.

Bourdine et al. "Design of graded refractive index profile for silica multimode optical fibers with improved effective modal bandwidth for short-distance lsaer-based multi-Gigabit data transmission over "O"-band", Proceedings of SPIE 10342, Apr. 2017. pp. 1-12.

International Search Report and Written Opinion PCT/US2018/039003 dated Oct. 5, 2018, 12 Pgs.

\* cited by examiner

WIDE-BAND MULTIMODE OPTICAL FIBERS WITH CORES HAVING A RADIALLY-DEPENDENT ALPHA PROFILE

This application claims the benefit of priority under 35 U.S.C. § 119 of U.S. Provisional Application Ser. No. 62/523,320 filed on Jun. 22, 2017 the content of which is relied upon and incorporated herein by reference in its entirety.

BACKGROUND

The disclosure generally relates to wide-band multimode optical fibers and, more particularly, to wide-band multimode optical fibers (MMFs) with cores having a radially-dependent alpha profile.

Optical fibers, including multimode optical fibers, are being envisioned for use in data centers and fiber home networks, among other applications, with enlarged operating windows to facilitate data transmission over increasingly larger wavelength ranges. For example, multimode optical fiber (MMF) designs with graded index cores are being designed and envisioned to operate over a range of wavelengths near 850 nm. Recent applications envision operating wavelengths that are not limited to wavelengths near 850 nm. Some recent applications envision operating wavelengths that are in a range of 840 nm to 860 nm. Additional recent applications envision operating wavelengths that fall within the range of 840 nm to 953 nm. Some of these new optical fiber designs are being contemplated with complex refractive index profiles, often with two or more dopants having different concentration profiles. In order to meet the OM4 standard for modal bandwidth set forth by TIA, the MMF must have an effective modal bandwidth (EMB) of 4700 MHz-km at 850 nm. Recently, a new standard for MMFs has been proposed and standardized by TIA, which is referred to as OM5 and documented in TIA-492AAAE. For an MMF to meet the OM5 standard the MMF must meet the OM4 EMB requirement at 850 nm while additionally providing an EMB at 953 nm of 2470 MHz-km.

The MMFs currently in production have peak wavelengths that are located near an upper end of a range that is acceptable for meeting OM5 standards set forth by TIA. The range that a peak wavelength can fall within to meet the OM4 standards set forth by TIA is roughly between 815 nm to 895 nm. In order to meet the OM5 EMB at 953 nm, current MMFs typically are provided with a peak wavelength at or above 880 nm. However, currently available MMFs that meet the OM4 standards typically have a differential modal dispersion (DMD) centroid at their peak wavelength that is flat, while the DMD centroid at longer wavelengths (e.g. 950 nm) typically shifts to a fronting or right-tilt profile, which can make it difficult to manufacture MMFs that meet the OM5 standard at 850 nm and 953 nm.

Accordingly, there is a need for wide-band MMFs with DMD centroids at their peak wavelength that have profiles that are tailing or left-tilted and have increased EMBs at wavelengths that are greater than 850 nm, for example, 950 nm.

SUMMARY

One aspect of the present disclosure relates to a multimode optical fiber. The multimode optical fiber includes a core region comprising silica and an outer radius, R. A cladding of the fiber surrounds the core region and includes silica. The core region has a refractive index profile with a radially-dependent alpha. The radially-dependent alpha is given by $\alpha(r)=f(r)$ and transitions from a greater alpha value, $\alpha_0$, at a center of the core region to a lesser alpha value at the outer radius in a continuous manner. A difference, $\Delta\alpha$, between the greater alpha value and the lesser alpha value is from 0.005 to 0.08.

Another aspect of the present disclosure relates to a multimode optical fiber that includes a core region in the fiber that includes silica and has an outer radius, R. A cladding of the fiber surrounds the core region and includes silica. The core region has a refractive index profile with a radially-dependent alpha that transitions from a greater alpha value, $\alpha_0$, at a center of the core region to a lesser alpha value at the outer radius in a continuous manner. A difference, $\delta$, between the greater alpha value and the lesser alpha value is from 0.005 to 0.08 and $\alpha_0$ is from 1.7 to 2.3.

A further aspect of the present disclosure relates to a multimode optical fiber that includes a core region in the fiber comprising silica and an outer radius, R. A cladding of the fiber surrounds the core region and includes silica. The core region has a refractive index profile with a radially-dependent alpha given by $\alpha(r)=\alpha_0-\Delta\alpha(r/R)^n$, where $\alpha_0$ is from 1.9 to 2.3, $\Delta\alpha$ is from 0.005 to 0.08, r, a radial location within the core region, is from 0 to R, and n is between about 1 and about 3.

In some embodiments of the foregoing aspects of a multimode optical fiber, the radially-dependent alpha may be given by $\alpha(r)=\alpha_0-\Delta\alpha(r/R)^n$. In some alternative embodiments of the foregoing aspects of a multimode optical fiber, the radially-dependent alpha may be given by $\alpha(r)=2.0557+0.0263\cdot\Delta_{1max}\cdot[1-(r/R)^{\alpha_0}]+\delta$.

In embodiments of the foregoing aspects of a multimode optical fiber, $\alpha_0$ can be in the range of about 1.7 to about 2.3, about 1.7 to about 2.2, about 1.7 to about 2.1, about 1.7 to about 2.0, about 1.7 to about 1.9, about 1.7 to about 1.8, about 1.8 to about 2.3, about 1.8 to about 2.2, about 1.8 to about 2.1, about 1.8 to about 2.0, about 1.8 to about 1.9, about 1.9 to about 2.3, about 1.9 to about 2.2, about 1.9 to about 2.1, about 1.9 to about 2.0, about 2.0 to about 2.3, about 2.0 to about 2.2, about 2.0 to about 2.1, about 2.1 to about 2.3, about 2.1 to about 2.2, or about 2.2 to about 2.3. The fiber can have $\Delta\alpha$ be in the range of about 0.005 to 0.08, about 0.006 to 0.07, about 0.007 to 0.06, about 0.008 to 0.05, or about 0.01 to 0.04. In some embodiments of the foregoing aspects, an average modal bandwidth of the fiber at 950 nm is at least 2.5 GHz-km and a peak wavelength of the fiber is in the range of 870 nm to 900 nm. In further embodiments of the foregoing aspects of a multimode optical fiber, a modal bandwidth of the fiber at 950 nm is at least 10% greater than a modal bandwidth of a comparative fiber at 950 nm. The comparative fiber has a core region with a refractive index profile with a constant alpha, $\alpha$, that is approximately equal to $\alpha_0$. In embodiments, an average modal bandwidth of the fiber at 850 nm is at least 4.7 GHz-km.

In some of the foregoing aspects of the multimode optical fiber, the core region is doped with $GeO_2$ and the cladding is doped with fluorine. In embodiments, the cladding includes a depressed region that has a relative refractive index that is substantially constant and lower than a relative refractive index of the core region and the remaining portion of the cladding. In other embodiments, the cladding further includes an inner cladding that has a relative refractive index between a relative refractive index of the core region and a relative refractive index of the depressed region, and the depressed region is separated from the core region by the inner cladding.

In some embodiments of the foregoing aspects, n is equal to 2. In other embodiments the core has a relative refractive index from 0.7% to 1.3%. The core can have an outer radius, R, from about 14 μm to about 27 μm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 1 schematically illustrates a cross-sectional view of a multimode optical fiber.

FIG. 1A depicts a schematic refractive index profile of the multimode optical fiber depicted in FIG. 1.

FIG. 2 is a graph illustrating a bandwidth versus wavelength plot and the associated peak profiles of two comparative fibers with constant alpha profiles.

FIG. 3 is a graph illustrating an effective modal bandwidth versus wavelength plot for four exemplary fibers.

FIG. 4 is a graph illustrating alpha value versus normalized radius for a comparative fiber and a fiber of the present disclosure.

FIG. 5 is a graph illustrating refractive index as a function of radius shown for a comparative fiber and a fiber of the present disclosure.

FIG. 6 is a graph illustrating the difference in the refractive index profiles of the comparative fiber and the fiber of the present disclosure depicted in FIG. 5.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

As used herein, "root mean square pulse broadening" or "RMS pulse broadening" refers to the degree of pulse broadening (e.g., in units of ns/km) at a given wavelength, at or away from the wavelength corresponding to the bandwidth for a given fiber. Further, root mean square (RMS) pulse broadening is the result of RMS time delay in a multimode (MMF) optical fiber. More particularly, RMS pulse broadening, σ, is given by Equations (1) and (2):

$$\sigma^2 = \langle \tau^2 \rangle - \langle \tau \rangle^2 \tag{1}$$

$$\tau(m) = \frac{Lm_1}{c}\left(1 - B + \frac{\lambda}{2}\frac{n_1}{m_1}\frac{dB}{d\lambda}\right)\Big/\sqrt{1-B} \tag{2}$$

where τ(m) is the time delay of mode m, L is the fiber length, $m_1$ is the material dispersion coefficient, $n_1$ is the refractive index value in the center of the core of the fiber, B is the normalized propagation constant, λ is the wavelength, c is the velocity of light in a vacuum, and < > denotes the average operation (as shown below in Equation (2A)). For a set of variables, $x_1, x_2, \ldots x_N$, the average of x is given by Equation (2A) as follows:

$$\langle x \rangle = \frac{\sum_{i=1}^{N} x_i}{N} \tag{2A}$$

The "refractive index profile" is the relationship between refractive index or relative refractive index and waveguide fiber radius.

The terms "μm" and "micron" are used interchangeably herein.

The "relative refractive index percent" is defined in Equation (3) below as:

$$\Delta\% = 100 \times (n_i^2 - n_c^2)/2n_i^2 \tag{3}$$

where $n_c$ is the refractive index of undoped silica and $n_i$ is the average refractive index at point i in the particular region of the optical fiber.

As further used herein, the relative refractive index is represented by Δ (and δ), and its values are given in units of "%," unless otherwise specified. The terms Δ, % Δ, Δ %, delta index, percent index, percent delta index and % can be used interchangeably herein. In cases where the refractive index of a region is less than the refractive index of undoped silica, the relative index percent is negative and is referred to as having a depressed region or depressed index. In cases where the refractive index is greater than the refractive index of undoped silica, the relative index percent is positive. An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Further, the terms "germania," "Ge" and "$GeO_2$" are used interchangeably herein and refer to $GeO_2$. Examples of down-dopants include F and B. Further, the terms "fluorine" and "F" are used interchangeably to denote a fluorine dopant originating from a fluorine dopant precursor including but not limited to $CF_4$, $SiF_4$ and $C_2F_6$.

As also used herein, the terms "blanks," "preforms," and "optical preforms" are interchangeable and refer to an article comprising doped or undoped silica that can be used to make an optical fiber in optical fiber manufacturing. The term "soot" refers to doped or undoped silica particles having a diameter in the range of about 5 nm to about 5 microns. Soot preforms can comprise soot having a surface area of ≥2 $m^2/g$. In some embodiments, the soot preforms comprise soot having a surface area of ≥5 $m^2/g$; in some embodiments, the soot has a surface area of ≥20 $m^2/g$; in some embodiments, the soot has a surface area of ≥50 $m^2/g$; in some embodiments, the soot has a surface area of ≥200 $m^2/g$; and, in some embodiments, the soot has a surface area of ≥2 $m^2/g$ and ≤50 $m^2/g$. Soot preforms can comprise soot having a bulk density of ≥0.1 $g/cm^2$; in some embodiments, the soot has a bulk density of ≥0.2 $g/cm^2$; in some embodiments, the soot has a bulk density of ≥0.5 $g/cm^2$; in some embodiments, the soot has a bulk density of ≥1 $g/cm^2$; and, in some embodiments, the soot has a bulk density of ≥0.2 $g/cm^2$ and ≤1 $g/cm^2$.

The term "alpha" or "α-profile" refers to a relative refractive index profile, expressed in terms of Δ(r). Δ(r) is in units of "%," where r is radius, and follows Equation (4) as follows:

$$\Delta_0(r) = \Delta_{1max} \cdot \left[1 - \left(\frac{r}{R}\right)^\alpha\right] \quad (4)$$

where $\Delta_{1max}$ is the peak refractive index change in the center of the fiber or fiber preform (i.e., core delta), and R is the core radius. Unless otherwise specified, alpha as reported herein is a refractive index profile measured at 850 nm. An α=1 corresponds to a triangular relative refractive index profile, an α=2 describes a parabolic profile, and α>12 corresponds to a profile approaching a step index (i.e., a "step-like index profile" as used herein) profile. Accordingly, α=∞ corresponds to a pure step-index profile. A comparative fiber has a standard or comparative alpha profile that follows Equation (5):

$$n^2(r) = n_{core}^2\left[1 - 2\Delta \cdot \left(\frac{r}{R}\right)^\alpha\right] \quad (5)$$

where α maintains a constant value.

Equations (4) and (5) describe the refractive index of a comparative MMF. Comparative MMFs have a constant value for α at all locations along a diameter of the core region. Alterations to the value of α result in a change in the wavelength where the MMF reaches the maximum modal bandwidth. For example, MMFs with an α value of about 2.10 have a maximum modal bandwidth at about 850 nm. The DMD centroid of an MMF is defined as an average delay of a received laser pulse at a particular DMD launch offset. At or near the maximum modal bandwidth of the MMF, the DMD centroid may have a profile that is generally flat. However, as the wavelength of light moves to wavelengths that are longer than the wavelength associated with the maximum modal bandwidth, the profile of the DMD centroid may become right-tilted or fronting. For example, the DMD centroid may be flat at the maximum modal bandwidth wavelength of 850 nm, however as the wavelength increases to 950 nm, the DMD centroid becomes right-tilted and asymmetrical. The right-tilting of the DMD centroid is a consequence of a shift in the offset between laser pulses and the particular DMD launch offset. The shift in the offset between laser pulses and the particular DMD launch offset results from a dispersion of the material used to make the MMF as the radial position within the core region transitions between the center of the core region and the outer radius of the core region. When lower α values are used, such as α values below 2.10, the wavelength associated with the maximum modal bandwidth increases. In order to attain the modal bandwidth requirement necessary to meet the OM5 standards at longer wavelengths, such as 900 nm or 950 nm, it may be beneficial for the MMF to have a peak wavelength that is greater than 850 nm.

According to one aspect of the present disclosure, the α value of the MMFs includes a radial dependence based on a radial position within the core region of the fiber. The radial dependence can generally take the form of Equation (6):

$$\alpha(r) = f(r) \quad (6)$$

where α(r) is the radial profile of α within the core region and f(r) indicates that α varies as a function of radius, r, within the core region. Combining Equations (5) and (6), the refractive index of the core region can follow the form of Equation (7):

$$n^2(r) = n_{core}^2\left[1 - 2\Delta \cdot \left(\frac{r}{R}\right)^{\alpha(r)}\right] \quad (7)$$

The function α(r) may take various functional forms that provide a smooth, monotonic, and/or continuous transition from the center of the core region to an outer radius, R, of the core region. The function α(r) has a radial dependence that is based on the baseline of a fixed alpha value, however the MMFs of the present disclosure have alpha values that decrease as a function of the radial position along the radius of the core region. For example, the alpha value at the outer radius of the core region may be about 0.005 to about 0.08 lower than the alpha value at the center of the core region.

According to an aspect of the disclosure, Equation (7) can be rearranged according to the form depicted below in Equation (8). In particular, α in the core region varies as a function of radial position such that the value of alpha decreases as the radial displacement from the center of the core region increases.

$$\alpha(r) = \alpha_0 - \Delta\alpha \cdot \left(\frac{r}{R}\right)^n \quad (8)$$

Figure 4:
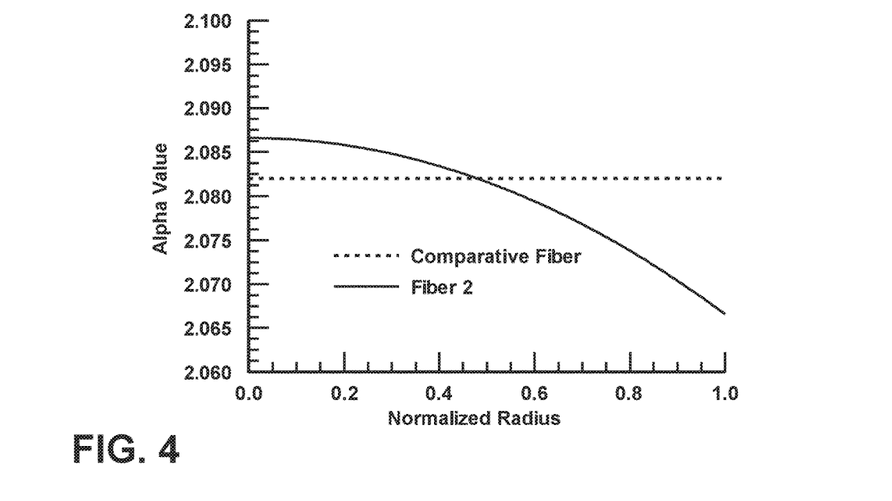

Equation (8) depicts the implementation of a "ramping" alpha profile across the radius of the core region, according to one embodiment. The radially dependent alpha has a baseline, that is, a starting point at the center of the core region, of $\alpha_0$. The radial dependence of a is built upon the initial $\alpha_0$ value. By using a normalized radius of r/R, the difference between the alpha profile of a comparative MMF and the MMFs disclosed herein can be clearly seen. As shown in FIG. 4, the alpha value of the MMFs disclosed herein is largest at the center of the core region, which is the position associated with an x-coordinate of 0.0. The greatest change, or Δα, occurs at the outer radius of the core region, which is the position associated with an x-coordinate of 1.0 on FIG. 4. The exponent, n, in Equation (8) determines how the change in alpha scales with the radius of the core region and Δα controls the magnitude, or strength, of the change. It is contemplated that MMFs may be provided that have an alpha value at the outer radius of the core region that is less than the alpha value at the center of the core region that have alpha profiles that follow relationships other than that specifically disclosed in Equation (8). Equation (8) is an exemplary embodiment of the radial dependence of the alpha value and is not intended to limit the present disclosure.

According to another aspect, the α profile in the core region of the MMF may be alternatively defined. First, a profile with a constant alpha value of $\alpha_0$ that is intended for a specific peak wavelength is defined in Equation (9) below.

$$\Delta_0(r) = \Delta \cdot \left[1 - \left(\frac{r}{R}\right)^{\alpha_0}\right] \quad (9)$$

Next, a local correction or perturbation of the alpha value at each location r along the radius of the core region is introduced to broaden the peak width or bandwidth window.

The local correction or perturbation of the alpha value depends on the Δ value defined by Equation (9), which is expressed in Equation (10).

$$\alpha(r) = 2.0557 + 0.0263 \cdot \Delta_0(r) + \delta \tag{10}$$

According to alternative embodiments, combining Equation (4) with Equation (10) yields Equation (11). The radial dependence of α within the core region may follow Equation (11):

$$\alpha(r) = 2.0557 + 0.0263 \cdot \Delta_{1max} \cdot \left[1 - \left(\frac{r}{R}\right)^{\alpha_0}\right] + \delta \tag{11}$$

In one embodiment that utilizes the relationship set forth in Equation (11), an MMF is disclosed where the value of $\alpha_0$ is 2.082 and the value of δ is 0.00585.

In some embodiments, where the core region has a refractive index profile with a radially-dependent alpha given by any one of Equation (8), Equation (9), Equation (10), or Equation (11), the modal bandwidth of the MMFs at longer wavelengths, such as wavelengths above the peak wavelength, is greater than the modal bandwidth of a comparative MMF, which has a constant alpha value, at the same wavelength. An average modal bandwidth of the fiber from 850 nm to 950 nm is at least 10% greater than an average modal bandwidth of a comparative fiber from 850 nm to 950 nm. The comparative fiber includes the core region that has a refractive index profile with a constant alpha, α, that is approximately equal to $\alpha_0$. Further, the optical fiber can have a modal bandwidth at 950 nm that is at least 10% greater than a modal bandwidth of the comparative fiber at 950 nm. In some embodiments of the foregoing aspects of a multimode optical fiber, a modal bandwidth of the fiber at 950 nm is at least 12% greater than a modal bandwidth of a comparative fiber at 950 nm. In some embodiments of the foregoing aspects of a multimode optical fiber, a modal bandwidth of the fiber at 950 nm is at least 14% greater than a modal bandwidth of a comparative fiber at 950 nm. In some embodiments of the foregoing aspects of a multimode optical fiber, a modal bandwidth of the fiber at 950 nm is at least 16% greater than a modal bandwidth of a comparative fiber at 950 nm. In some embodiments of the foregoing aspects of a multimode optical fiber, a modal bandwidth of the fiber at 950 nm is at least 18% greater than a modal bandwidth of a comparative fiber at 950 nm. In some embodiments of the foregoing aspects of a multimode optical fiber, a modal bandwidth of the fiber at 950 nm is at least 20% greater than a modal bandwidth of a comparative fiber at 950 nm. In some embodiments that employ a radially-dependent alpha, $\alpha_0$ can be in the range of about 1.9 to 2.3, about 1.9 to 2.2, about 1.9 to 2.1, about 1.9 to 2.0, about 2.0 to 2.3, about 2.0 to 2.2, about 2.0 to 2.1, about 2.1 to 2.3, about 2.1 to 2.2, or about 2.2 to 2.3, Δα can be in the range of about 0.005 to 0.08, about 0.006 to 0.07, about 0.007 to 0.06, about 0.008 to 0.05, or about 0.01 to 0.04, a radial location, r, within the core region, can be from 0 to R, and $\Delta_{1max}$ is a peak refractive index change in the center of the core region where r=0.

The manufacturing and processing methods in this disclosure for making core preforms for optical fibers and optical fibers as a whole are intended for wide-band, multimode optical fibers (MMFs). As used herein, the terms "wide-band, multimode optical fibers" and "wide-band MMFs" are used interchangeably and are indicative of multimode optical fibers having a bandwidth of at least 2 GHz-km at all wavelengths within a sub-window of at least 50 nm between a wavelength range of 800-1000 nm. In some embodiments, wide-band MMFs have a bandwidth of at least 2 GHz-km at all wavelengths within a sub-window of at least 75 nm between a wavelength range of 800-1000 nm. In some embodiments, wide-band MMFs have a bandwidth of at least 2 GHz-km at all wavelengths within a sub-window of at least 100 nm between a wavelength range of 800-1000 nm. In some embodiments, wide-band MMFs have a bandwidth of at least 2 GHz-km at all wavelengths within a sub-window of at least 150 nm between a wavelength range of 800-1000 nm. In some embodiments, wide-band MMFs have a bandwidth of at least 2 GHz-km at all wavelengths within a wavelength range of 800-1000 nm. In some embodiments, wide-band MMFs have a bandwidth of ≥2.5 GHz-km at all wavelengths within a sub-window of at least 50 nm between a wavelength range of 800-1000 nm. In some embodiments, wide-band MMFs have a bandwidth of ≥2.5 GHz-km at all wavelengths within a sub-window of at least 75 nm between a wavelength range of 800-1000 nm. In some embodiments, wide-band MMFs have a bandwidth of ≥2.5 GHz-km at all wavelengths within a sub-window of at least 100 nm between a wavelength range of 800-1000 nm. In some embodiments, wide-band MMFs have a bandwidth of ≥2.5 GHz-km at all wavelengths within a sub-window of at least 150 nm between a wavelength range of 800-1000 nm. In some embodiments, wide-band MMFs have a bandwidth of ≥2.5 GHz-km at all wavelengths within a wavelength range of 800-1000 nm. In some embodiments, wide-band MMFs have a bandwidth of ≥3 GHz-km at all wavelengths within a sub-window of at least 50 nm between a wavelength range of 800-1000 nm. In some embodiments, wide-band MMFs have a bandwidth of ≥3 GHz-km at all wavelengths within a sub-window of at least 75 nm between a wavelength range of 800-1000 nm. In some embodiments, wide-band MMFs have a bandwidth of ≥3 GHz-km at all wavelengths within a sub-window of at least 100 nm between a wavelength range of 800-1000 nm. In some embodiments, wide-band MMFs have a bandwidth of ≥3 GHz-km at all wavelengths within a sub-window of at least 150 nm between a wavelength range of 800-1000 nm. In some embodiments, wide-band MMFs have a bandwidth of ≥3 GHz-km at all wavelengths within a wavelength range of 800-1000 nm. In some embodiments, wide-band MMFs have a bandwidth of ≥3.5 GHz-km at all wavelengths within a sub-window of at least 50 nm between a wavelength range of 800-1000 nm. In some embodiments, wide-band MMFs have a bandwidth of ≥3.5 GHz-km at all wavelengths within a sub-window of at least 75 nm between a wavelength range of 800-1000 nm. In some embodiments, wide-band MMFs have a bandwidth of ≥3.5 GHz-km at all wavelengths within a sub-window of at least 100 nm between a wavelength range of 800-1000 nm. In some embodiments, wide-band MMFs have a bandwidth of ≥3.5 GHz-km at all wavelengths within a sub-window of at least 150 nm between a wavelength range of 800-1000 nm. In some embodiments, wide-band MMFs have a bandwidth of ≥3.5 GHz-km at all wavelengths within a wavelength range of 800-1000 nm. In some embodiments, wide-band MMFs have a bandwidth of ≥4 GHz-km at all wavelengths within a sub-window of at least 50 nm between a wavelength range of 800-1000 nm. In some embodiments, wide-band MMFs have a bandwidth of ≥4 GHz-km at all wavelengths within a sub-window of at least 75 nm between a wavelength range of 800-1000 nm. In some embodiments, wide-band MMFs have a bandwidth of ≥4 GHz-km at all wavelengths within a sub-window of at least 100 nm between a wavelength range of 800-1000 nm. In some embodiments, wide-band MMFs have a bandwidth of ≥4 GHz-km at all wavelengths within a sub-window of at least 150 nm between a wavelength range of 800-1000 nm. In some embodiments, wide-band MMFs have a bandwidth of ≥4 GHz-km at all wavelengths within a wavelength range of 800-1000 nm. In some embodiments, wide-band MMFs have a bandwidth of ≥4.5 GHz-km at all wavelengths within a sub-window of at least 50 nm between a wavelength range of 800-1000 nm. In some embodiments, wide-band MMFs have a bandwidth of ≥4.5 GHz-km at all wavelengths within a sub-window of at least 75 nm between a wavelength range of 800-1000 nm. In some embodiments, wide-band MMFs have a bandwidth of ≥4.5 GHz-km at all wavelengths within a sub-window of at least 100 nm between a wavelength range of 800-1000 nm. In some embodiments, wide-band MMFs have a bandwidth of ≥4.5 GHz-km at all wavelengths within a sub-window of at least 150 nm between a wavelength range of 800-1000 nm. In some embodiments, wide-band MMFs have a bandwidth of ≥4.5 GHz-km at all wavelengths within a wavelength range of 800-1000 nm. In some embodiments, wide-band MMFs have a bandwidth of ≥5 GHz-km at all wavelengths within a sub-window of at least 50 nm between a wavelength range of 800-1000 nm. In some embodiments, wide-band MMFs have a bandwidth of ≥5 GHz-km at all wavelengths within a sub-window of at least 75 nm between a wavelength range of 800-1000 nm. In some embodiments, wide-band MMFs have a bandwidth of ≥5 GHz-km at all wavelengths within a sub-window of at least 100 nm between a wavelength range of 800-1000 nm. In some embodiments, wide-band MMFs have a bandwidth of ≥5 GHz-km at all wavelengths within a sub-window of at least 150 nm between a wavelength range of 800-1000 nm. In some embodiments, wide-band MMFs have a bandwidth of ≥5 GHz-km at all wavelengths within a wavelength range of 800-1000 nm.

The wide-band, high bandwidth MMFs disclosed herein are produced with an alpha profile that varies as a function of the radial position along a radius of the fiber. The radial dependence of the alpha profile can be accomplished by controlling the Ge doping profile in a chemical vapor deposition process, such as outside vapor deposition (OVD), vapor axial deposition (VAD), modified chemical vapor deposition (MCVD, plasma chemical vapor deposition (PCVD), or combinations thereof. The Ge concentration is controlled based on a target ramping alpha profile of the present disclosure. The refractive index change in the core region of the fiber follows the alpha profile, which is proportional to the Ge concentration. Accordingly, the Ge concentration decreases from a greater Ge concentration at the center of the core region to a lesser Ge concentration at the outer radius as the radial position within the fiber increases from the center to the outer radius. The continuous and monotonic variation of the Ge concentration as a function of radial position within the core region provides the target ramping alpha profile. A refractive index profile of a resultant preform is measured using a preform analyzer and compared to the target ramping alpha profile. Any difference between the observed profile and the target profile is used to provide feedback such that the profile may be tuned to correct for differences between the observed profile and the target profile. For example, if the observed profile has a refractive index at a given radial position within the core region that is greater than the target profile refractive index at the same radial position within the core region, then the Ge concentration at that radial position is decreased according to the difference in the observed profile and the target profile in subsequent preform fabrications. Similarly, if the observed profile has a refractive index at a given radial position within the core region that is less than the target profile refractive index at the same radial position within the core region, then the Ge concentration at that radial position is increased according to the difference in the observed profile and the target profile in subsequent preform fabrications. Several iterations may be necessary to acquire a tuned profile that provides an observed profile that matches the target profile. Next, a preform is drawn into a fiber. Then, the fiber is measured for differential mode delays (DMD) at various wavelengths to determine the fibers bandwidth at the various wavelengths. An alternative to the direct evaluation of the refractive index change as a function of radial position within the core for measuring the observed profile involves measuring the DMD, or delay, at a particular wavelength. The DMD, or delay, at a particular wavelength may be used as an indirect measure of the refractive index change at that particular wavelength. Accordingly, calculated differences between the observed profile and the target profile may be corrected by the iterative process described above for altering the Ge concentration at given radial positions in subsequent fiber fabrications. Conversion of the measured DMD, or delay, to the change in refractive index is within the skill of one of ordinary skill in the art, as evidenced by the following references, which are hereby incorporated by reference: (1) Petermann, K., Simple Relationship Between Differential Mode Delay in Optical Fibres and the Deviation from Optimum Profile', Elect. Lett. 14, (1978) 14, p. 793 and (2) Stone, F. T., Ritger, A. J., and Head, E. D., 'The Use of a Quantitative Differential Mode Delay Technique to Improve Fiber Bandwidth', J. Lightwave Tech. 1 (1983) 4, p. 585. The fibers disclosed herein can be either bend insensitive with a depressed region (e.g. trench, moat, etc.) or non-bending insensitive without a depressed region. The depressed region can be made by doping fluorine into the cladding. As outlined in the following, certain aspects of the present disclosure pertain to the production and advantages of MMFs with alpha profiles that vary as a function of the radial position along the radius of the fiber.

Disclosed herein are MMFs with core regions that include a radially-dependent α profile. Advantages of the radially-varied α value in the core region of the MMF include, but are not limited to, increased EMB for all wavelengths within a range of 850 nm to 950 nm, less complex manufacturing processes due to a single dopant being used in the core region, and a decrease in the cost to manufacture the MMFs as a result of the single dopant used in the core region. These advantages are provided, at least in part, by the mathematical relationships laid out above in Equations (8)-(11) for the various embodiments of the present disclosure.

Figure 1:
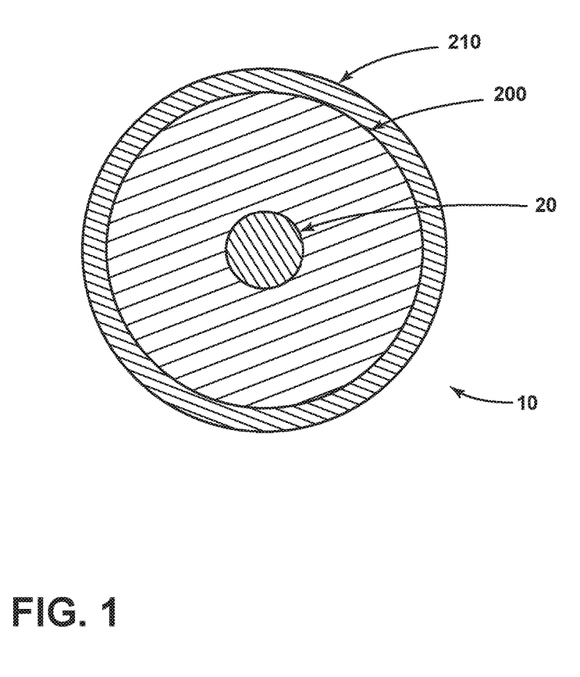

As depicted in FIG. 1, the multimode optical fiber 10 comprises a silica-based core 20 and a silica-based cladding layer (or cladding) 200 surrounding and directly adjacent (i.e. in contact with) the core 20. The fiber 10 can have a numerical aperture, NA, between 0.15 and 0.25, preferably between 0.185 and 0.215. Preferably, the bandwidth of the fiber 10 is greater than 2 GHz-km, where the peak bandwidth is centered on a wavelength between 800 nm and 1000 nm.

Figure 1A:
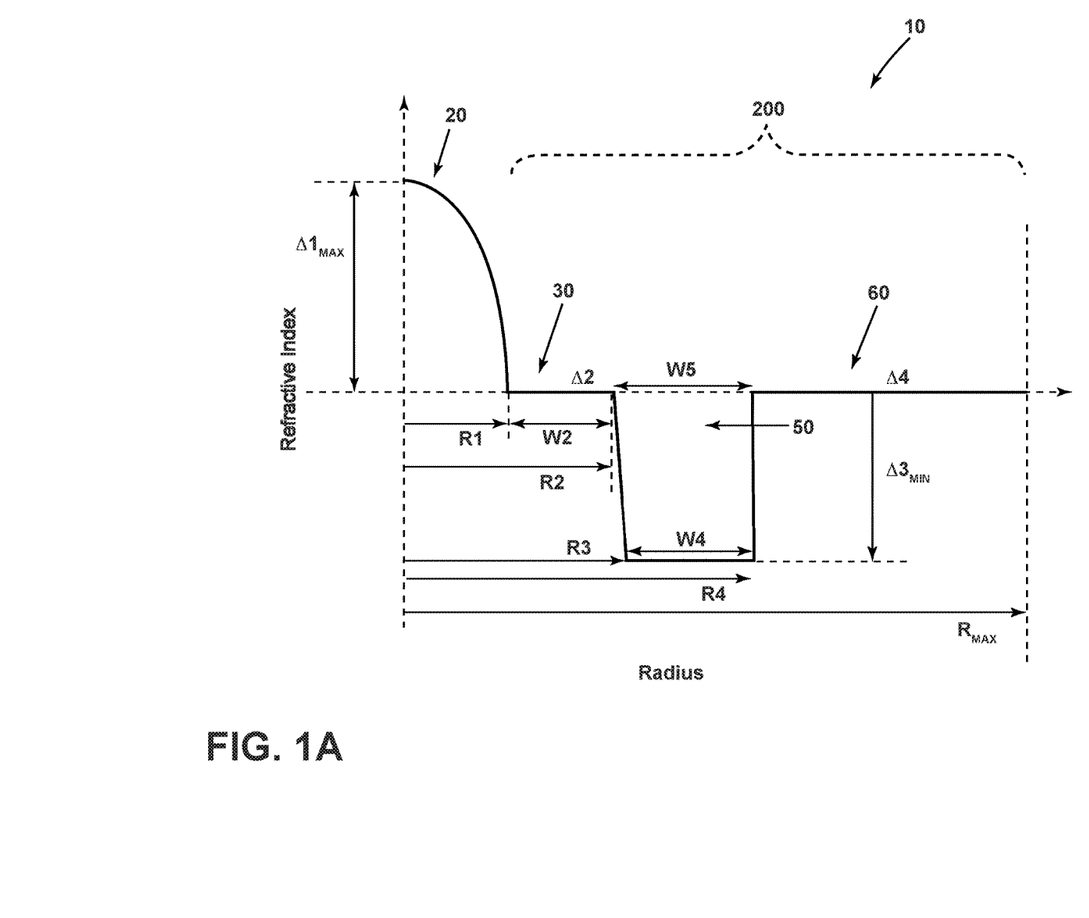

As shown in FIG. 1A, the core 20, includes a maximum index, $\Delta 1_{max}$, of the multimode optical fiber 10 extends from a centerline at r=0 to an outermost core radius, R1, typically about 12 to 30 μm, and in some embodiments between 23.5 and 26.5 μm. The cladding 200 extends from the radius, R1 to an outermost cladding radius, $R_{MAX}$, and has a relative refractive index, Δ4. In some embodiments, the cladding 200 has an inner cladding 30 having a relative refractive index, Δ2, an outer radius, R2 and a width, W2=R2−R1. In some embodiments, the cladding 200 of the optical fiber 10 includes a silica-based region 50 having a relative refractive index, $\Delta 3_{MIN}$, a minimum radius, R3, an outer radius, R4, a maximum width, W5=R4−R2, and a minimum width, W4=R4−R3, surrounding the core and having a refractive index lower than that of silica by virtue of doping with a down-dopant. The silica-based cladding region 50 (interchangeably referred to in the disclosure as a "trench 50" and a "moat 50") may comprise, for example, F and optionally GeO$_2$. In some embodiments, this silica-based cladding region 50 includes random or non-periodically distributed voids (for example filled with gas). The trench region 50 comprises a refractive index that is lower than the refractive index of the outer cladding layer 60 (e.g., between R4 and $R_{MAX}$). In some embodiments, the silica-based region 50 extends through the entire cladding 200. In other embodiments, an outer cladding layer 60 surrounds the cladding region 50. In some embodiments, the cladding 200 of the optical fiber 10 includes a silica-based region 50 surrounding the core and having a refractive index, $\Delta 3_{MIN}$, which is lower than the relative refractive index of the outer cladding layer 60, $\Delta 4$. Also included in some embodiments of the fiber 10 (not shown in FIG. 1A) are primary and secondary polymer coatings that surround the fiber 10.

In some embodiments an optional silica based inner cladding layer 30 is situated between the core 20 and the silica-based region 50, typically containing a down-dopant. An exemplary schematic relative refractive index profile of the multi-mode optical fiber 10 is depicted in FIG. 1A. In some embodiments, the silica-based region 50 is offset from the core 20 by a width W2=R2−R1, and is configured such that the region 50 begins at r=R2 and ends at r=R3 with a width W3=R3−R2. In other embodiments the silica-based region 50 directly abuts the core 20, and may have a rectangular or a trapezoidal cross section.

Referring again to FIG. 1A, the cladding 200 extends from $R_1$ to an outermost cladding radius, $R_4$. In some embodiments, the cladding 200 comprises Ge—F co-doped silica (e.g., in the inner cladding layer 30). In some embodiments, the cladding 200 comprises F-doped silica (e.g., in the trench region 50). For example, in some embodiments the trench region 50 is surrounded, by a silica-based outer cladding layer 60 (e.g., a pure silica outer cladding layer or an up-doped silica-based outer cladding layer). In some embodiments, the cladding 200 is surrounded by one or more coatings 210 (see FIG. 1), for example by an acrylate polymer.

The multimode optical fiber 10 includes the core region 20 and the cladding 200. The core region 20 and the cladding 200 may include silica. The core 20 may be doped with GeO$_2$ and the cladding 200 may be doped with fluorine. The core region 20 has an outer radius, R. The cladding 200 surrounds the core region 20.

Figure 2:
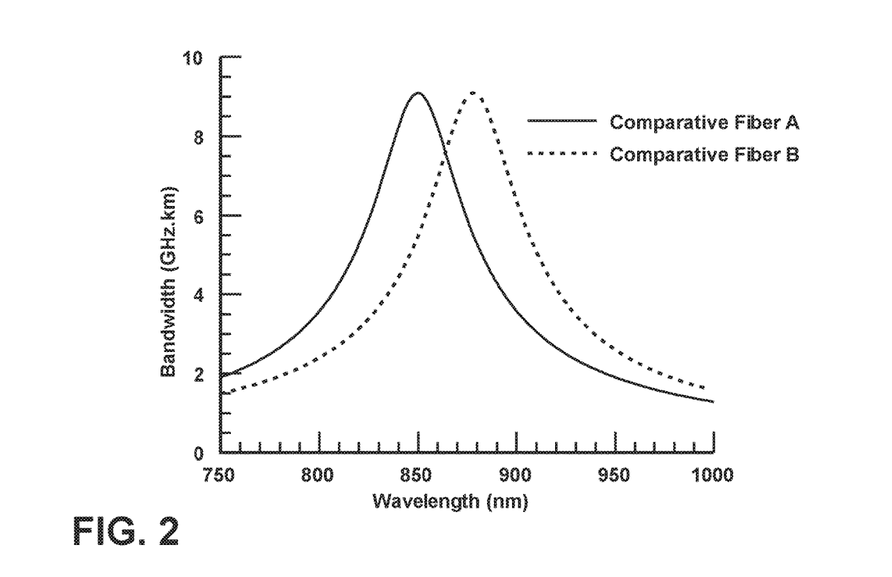

By way of example, FIG. 2 depicts the modal bandwidth of two comparative MMFs. Comparative Fiber A has a maximum modal bandwidth at 850 nm. Accordingly, the modal bandwidth of Comparative Fiber A decreases as the wavelength of light increases from 850 nm. Comparative Fiber B has a maximum modal bandwidth at 880 nm. Comparative Fiber A and Comparative Fiber B have identical profiles or peak shapes. Thus, the modal bandwidth for Comparative Fiber B at higher wavelengths, such as 950 nm, is greater than the modal bandwidth of Comparative Fiber A at higher wavelengths. The shift of the wavelength associated with the maximum modal bandwidth for the MMF can be accomplished by lowering the value of $\alpha$, which can balance the modal bandwidth at wavelengths that are greater than or equal to 850 nm. While the modal bandwidth of Comparative Fiber B has increased at higher wavelengths, such as 950 nm, the modal bandwidth of Comparative Fiber B has decreased at wavelengths lower than 880 nm, such as 850 nm. The peak width, profile, and/or the peak shape are largely governed by material dispersion. Accordingly, lowering the value of $\alpha$ does not widen the curve or increase the peak width. Therefore, comparative MMFs have a narrow window that allows the MMF to meet the bandwidth requirements of both the OM4 (4700 MHz-km at 850 nm) and OM5 (2470 MHz-km at 953 nm) standards.

The present disclosure provides improved MMFs that are capable of meeting OM4 and OM5 standards with decreased manufacturing cost and increased manufacturing yield. Lowering the value of $\alpha$ may provide a DMD centroid, or an average delay, that is left-tilted. Therefore, at the optimal wavelength (e.g., the wavelength associated with the maximum modal bandwidth) the higher order modes (HOM) of the DMD centroid can be slightly leading as a result of a locally lower $\alpha$ value at an outer portion of the core region, which may prevent an excessive right-tilt of the DMD centroid at a longer wavelength. Providing a lower value of $\alpha$ at positions along the radius that are displaced from the center of the core region may have a minor or negligible effect at the peak wavelength, such as the wavelength associated with the maximum modal bandwidth, while having a significant effect or benefit with an increase in the modal bandwidth at longer wavelengths, such as 950 nm. Said another way, the HOM of the MMF show a decreased delay relative to other portions of the MMF, therefore increasing the modal bandwidth. The present disclosure expands upon this understanding to provide new and improved MMF profile designs, such as those shown in FIG. 3, that broaden the bandwidth window or peak width to meet both OM4 and OM5 requirements with greater production yield and reproducibility.

Figure 3:
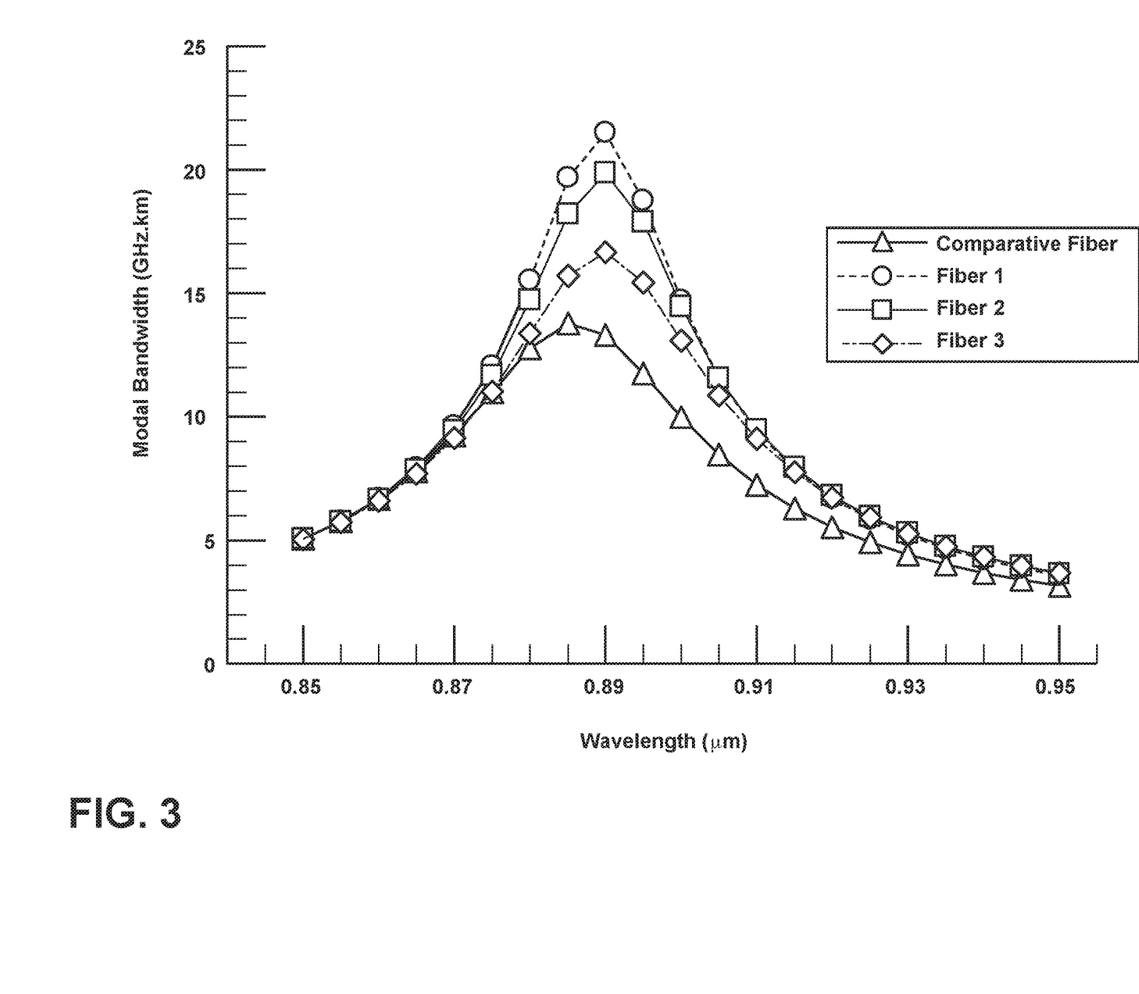

Referring now to FIG. 3, a graph illustrating an effective modal bandwidth versus wavelength plot for three exemplary fibers according to the present disclosure and one comparative fiber is shown. The fibers include Comparative Fiber, which is a comparative fiber that has an $\alpha$ profile in the core that is constant. Fibers 1-3 are exemplary fibers 10 that include an $\alpha$ profile in the core 20 that varies with the radial position within the core 20. A comparison of Comparative Fiber to Fibers 1-3 shows a dramatic increase in the modal bandwidth of the fibers 10 at the peak wavelength. Additionally, the peak width and modal bandwidth at 950 nm is increased when comparing Comparative Fiber to Fibers 1-3. The alteration of the alpha profile, and by extension the refractive index profile, disclosed herein provides a substantial increase in the manufacturing yield of the wide-band MMFs.

In embodiments where the core region 20 has a refractive index profile with a radially-dependent alpha (e.g., Fibers 2-4), $\alpha_0$ can be in the range of about 1.7 to about 2.3, about 1.7 to about 2.2, about 1.7 to about 2.1, about 1.7 to about 2.0, about 1.7 to about 1.9, about 1.7 to about 1.8, about 1.8 to about 2.3, about 1.8 to about 2.2, about 1.8 to about 2.1, about 1.8 to about 2.0, about 1.8 to about 1.9, about 1.9 to about 2.3, about 1.9 to about 2.2, about 1.9 to about 2.1, about 1.9 to about 2.0, about 2.0 to about 2.3, about 2.0 to about 2.2, about 2.0 to about 2.1, about 2.1 to about 2.3, about 2.1 to about 2.2, or about 2.2 to about 2.3. The fiber 10 can have $\Delta\alpha$ be in the range of about 0.005 to 0.08, about 0.006 to 0.07, about 0.007 to 0.06, about 0.008 to 0.05, or about 0.01 to 0.04. A radial location, r, within the core region 20, can be from 0 to R. Embodiments with a radially-dependent alpha that include n can have n between about 1 and about 3. In some embodiments, n may be equal to 2.

According to some embodiments, an average modal bandwidth of the fiber 10 at 950 nm is at least 1.3 GHz-km. In some embodiments, the average modal bandwidth of the fiber 10 at 950 nm is at least 1.4 GHz-km. In some embodiments, the average modal bandwidth of the fiber 10 at 950 nm is at least 1.5 GHz-km. In some embodiments, the average modal bandwidth of the fiber 10 at 950 nm is at least 1.6 GHz-km. In some embodiments, the average modal bandwidth of the fiber 10 at 950 nm is at least 1.7 GHz-km. In some embodiments, the average modal bandwidth of the fiber 10 at 950 nm is at least 1.8 GHz-km. In some embodiments, the average modal bandwidth of the fiber 10 at 950 nm is at least 1.9 GHz-km. In some embodiments, the average modal bandwidth of the fiber 10 at 950 nm is at least 2.0 GHz-km. In some embodiments, the average modal bandwidth of the fiber 10 at 950 nm is at least 2.1 GHz-km. In some embodiments, the average modal bandwidth of the fiber 10 at 950 nm is at least 2.2 GHz-km. In some embodiments, the average modal bandwidth of the fiber 10 at 950 nm is at least 2.3 GHz-km. In some embodiments, the average modal bandwidth of the fiber 10 at 950 nm is at least 2.4 GHz-km. In some embodiments, the average modal bandwidth of the fiber 10 at 950 nm is at least 2.5 GHz-km. In some embodiments, the average modal bandwidth of the fiber 10 at 950 nm is at least 2.6 GHz-km. In some embodiments, the average modal bandwidth of the fiber 10 at 950 nm is at least 2.7 GHz-km. In some embodiments, the average modal bandwidth of the fiber 10 at 950 nm is at least 2.8 GHz-km. In some embodiments, the average modal bandwidth of the fiber 10 at 950 nm is at least 2.9 GHz-km. In some embodiments, the average modal bandwidth of the fiber 10 at 950 nm is at least 3.0 GHz-km. In some embodiments, the average modal bandwidth of the fiber 10 at 950 nm is at least 3.1 GHz-km. In some embodiments, the average modal bandwidth of the fiber 10 at 950 nm is at least 3.2 GHz-km. In some embodiments, the average modal bandwidth of the fiber 10 at 950 nm is at least 3.3 GHz-km. In some embodiments, the average modal bandwidth of the fiber 10 at 950 nm is at least 3.4 GHz-km. In some embodiments, the average modal bandwidth of the fiber 10 at 950 nm is at least 3.5 GHz-km. In some embodiments, the average modal bandwidth of the fiber 10 at 950 nm is at least 3.6 GHz-km. In some embodiments, the average modal bandwidth of the fiber 10 at 950 nm is at least 3.7 GHz-km. In some embodiments, the average modal bandwidth of the fiber 10 at 950 nm is at least 3.8 GHz-km. In some embodiments, the average modal bandwidth of the fiber 10 at 950 nm is at least 3.9 GHz-km. In some embodiments, the average modal bandwidth of the fiber 10 at 950 nm is at least 4.0 GHz-km. In some embodiments, the average modal bandwidth of the fiber 10 at 950 nm is at least 4.1 GHz-km. In some embodiments, the average modal bandwidth of the fiber 10 at 950 nm is at least 4.2 GHz-km. In some embodiments, the average modal bandwidth of the fiber 10 at 950 nm is at least 4.3 GHz-km. In some embodiments, the average modal bandwidth of the fiber 10 at 950 nm is at least 4.4 GHz-km. In some embodiments, the average modal bandwidth of the fiber 10 at 950 nm is at least 4.5 GHz-km. In some embodiments, the average modal bandwidth of the fiber 10 at 950 nm is at least 4.6 GHz-km. In some embodiments, the average modal bandwidth of the fiber 10 at 950 nm is at least 4.7 GHz-km. In some embodiments, the average modal bandwidth of the fiber 10 at 950 nm is at least 4.8 GHz-km. In some embodiments, the average modal bandwidth of the fiber 10 at 950 nm is at least 4.9 GHz-km.

In some embodiments, the average modal bandwidth of the fiber 10 at 950 nm is at least 5.0 GHz-km.

In some embodiments, the optical fiber 10 can have a peak wavelength, $\lambda_{max}$, of the fiber 10 in the range of 850 nm to 920 nm. In some embodiments, the $\lambda_{max}$ of the fiber 10 can be in the range of 860 nm to 920 nm. In some embodiments, the $\lambda_{max}$ of the fiber 10 can be in the range of 870 nm to 920 nm. In some embodiments, the $\lambda_{max}$ of the fiber 10 can be in the range of 880 nm to 920 nm. In some embodiments, the $\lambda_{max}$ of the fiber 10 can be in the range of 890 nm to 920 nm. In some embodiments, the $\lambda_{max}$ of the fiber 10 can be in the range of 900 nm to 920 nm. In some embodiments, the $\lambda_{max}$ of the fiber 10 can be in the range of 910 nm to 920 nm. In some embodiments, the $\lambda_{max}$ of the fiber 10 can be in the range of 850 nm to 910 nm. In some embodiments, the $\lambda_{max}$ of the fiber 10 can be in the range of 850 nm to 900 nm. In some embodiments, the $\lambda_{max}$ of the fiber 10 can be in the range of 850 nm to 890 nm. In some embodiments, the $\lambda_{max}$ of the fiber 10 can be in the range of 850 nm to 880 nm. In some embodiments, the $\lambda_{max}$ of the fiber 10 can be in the range of 850 nm to 870 nm. In some embodiments, the $\lambda_{max}$ of the fiber 10 can be in the range of 850 nm to 860 nm. In some embodiments, the $\lambda_{max}$ of the fiber 10 can be in the range of 860 nm to 910 nm. In some embodiments, the $\lambda_{max}$ of the fiber 10 can be in the range of 870 nm to 900 nm. In some embodiments, the $\lambda_{max}$ of the fiber 10 can be in the range of 880 nm to 890 nm.

In some embodiments an average modal bandwidth of the fiber 10 at 850 nm is at least 2.5 GHz-km. In some embodiments an average modal bandwidth of the fiber 10 at 850 nm is at least 2.6 GHz-km. In some embodiments an average modal bandwidth of the fiber 10 at 850 nm is at least 2.7 GHz-km. In some embodiments an average modal bandwidth of the fiber 10 at 850 nm is at least 2.8 GHz-km. In some embodiments an average modal bandwidth of the fiber 10 at 850 nm is at least 2.9 GHz-km. In some embodiments an average modal bandwidth of the fiber 10 at 850 nm is at least 3.0 GHz-km. In some embodiments an average modal bandwidth of the fiber 10 at 850 nm is at least 3.1 GHz-km. In some embodiments an average modal bandwidth of the fiber 10 at 850 nm is at least 3.2 GHz-km. In some embodiments an average modal bandwidth of the fiber 10 at 850 nm is at least 3.3 GHz-km. In some embodiments an average modal bandwidth of the fiber 10 at 850 nm is at least 3.4 GHz-km. In some embodiments an average modal bandwidth of the fiber 10 at 850 nm is at least 3.5 GHz-km. In some embodiments an average modal bandwidth of the fiber 10 at 850 nm is at least 3.6 GHz-km. In some embodiments an average modal bandwidth of the fiber 10 at 850 nm is at least 3.7 GHz-km. In some embodiments an average modal bandwidth of the fiber 10 at 850 nm is at least 3.8 GHz-km. In some embodiments an average modal bandwidth of the fiber 10 at 850 nm is at least 3.9 GHz-km. In some embodiments an average modal bandwidth of the fiber 10 at 850 nm is at least 4.0 GHz-km. In some embodiments an average modal bandwidth of the fiber 10 at 850 nm is at least 4.1 GHz-km. In some embodiments an average modal bandwidth of the fiber 10 at 850 nm is at least 4.2 GHz-km. In some embodiments an average modal bandwidth of the fiber 10 at 850 nm is at least 4.3 GHz-km. In some embodiments an average modal bandwidth of the fiber 10 at 850 nm is at least 4.4 GHz-km. In some embodiments an average modal bandwidth of the fiber 10 at 850 nm is at least 4.5 GHz-km. In some embodiments an average modal bandwidth of the fiber 10 at 850 nm is at least 4.6 GHz-km. In some embodiments an average modal bandwidth of the fiber 10 at 850 nm is at least 4.7 GHz-km. In some embodiments an average modal bandwidth of the fiber 10 at 850 nm is at least 4.8 GHz-km. In some embodiments an average modal bandwidth of the fiber 10 at 850 nm is at least 4.9 GHz-km. In some embodiments an average modal bandwidth of the fiber 10 at 850 nm is at least 5.0 GHz-km. In some embodiments an average modal bandwidth of the fiber 10 at 850 nm is at least 5.1 GHz-km. In some embodiments an average modal bandwidth of the fiber 10 at 850 nm is at least 5.2 GHz-km. In some embodiments an average modal bandwidth of the fiber 10 at 850 nm is at least 5.3 GHz-km. In some embodiments an average modal bandwidth of the fiber 10 at 850 nm is at least 5.4 GHz-km. In some embodiments an average modal bandwidth of the fiber 10 at 850 nm is at least 5.5 GHz-km.

In some embodiments, the core 20 of the optical fiber 10 has a relative refractive index from 0.9% to 1.1%. In some embodiments, the core 20 of the optical fiber 10 has a relative refractive index from 0.9% to 1.2%. In some embodiments, the core 20 of the optical fiber 10 has a relative refractive index from 0.9% to 1.3%. In some embodiments, the core 20 of the optical fiber 10 has a relative refractive index from 0.8% to 1.2%. In some embodiments, the core 20 of the optical fiber 10 has a relative refractive index from 0.7% to 1.3%. In some embodiments, the outer radius, R, of the core 20 is from about 10 μm to about 30 μm. In some embodiments, the outer radius, R, of the core 20 is from about 11 μm to about 29 μm. In some embodiments, the outer radius, R, of the core 20 is from about 12 μm to about 28 μm. In some embodiments, the outer radius, R, of the core 20 is from about 13 μm to about 27 μm. In some embodiments, the outer radius, R, of the core 20 is from about 14 μm to about 27 μm. In some embodiments, the outer radius, R, of the core 20 is from about 14 μm to about 26 μm. In some embodiments, the outer radius, R, of the core 20 is from about 15 μm to about 25 μm. In some embodiments, the outer radius, R, of the core 20 is from about 16 μm to about 24 μm. In some embodiments, the outer radius, R, of the core 20 is from about 17 μm to about 23 μm. In some embodiments, the outer radius, R, of the core 20 is from about 18 μm to about 22 μm. In some embodiments, the outer radius, R, of the core 20 is from about 19 μm to about 21 μm.

EXAMPLES

The aspects of the alpha profile disclosed herein favor wide-band MMFs. The overall refractive index profile follows the radial-dependence of the alpha profile. More specifically, the radial-dependence of the alpha value is utilized to provide a transition from a larger refractive index at a center of the core 20 to a smaller refractive index at the outer radius, R, of the core 20, which may be referred to as a "ramp down" of the alpha value and/or the refractive index. The transition from the larger refractive index at the center of the fiber 10 to the smaller refractive index at the outer radius of the core 20 can be a linear transition. Alternatively, the transition from the larger refractive index at the center of the fiber 10 to the smaller refractive index at the outer radius of the core 20 can take the form of higher order functions (e.g. polynomials). As a result of the ramp down, an increase in the modal bandwidth at 950 nm is observed when the modal bandwidth at 850 nm is held constant (see Table 1).

TABLE 1

|  | Comparative Fiber | Fiber 1 | Fiber 2 | Fiber 3 |
| --- | --- | --- | --- | --- |
| Bandwidth at 850 nm (GHz-km) | 5.07 | 5.07 | 5.07 | 5.07 |
| Bandwidth at 880 nm (GHz-km) | 12.76 | 15.52 | 14.72 | 13.38 |
| Bandwidth at 950 nm (GHz-km) | 3.16 | 3.58 | 3.647 | 3.673 |
| Bandwidth Improvement at 950 nm (%) | 0 | 13.3 | 15.4 | 16.2 |

The example fibers (Fibers 1-3) shown in Table 1 include a Comparative Fiber that has a constant alpha profile in the core 20 of the fiber 10 and exemplary fibers that include an alpha profile that varies as a function of radial position within the core 20 (Fibers 1-3). See FIG. 3 for a graphical representation of the information presented in Table 1.

Table 2 shows various figures of merit for the Comparative Fiber and the exemplary radially-dependent α fibers (Fibers 1-3).

TABLE 2

|  | Comparative Fiber | Fiber 1 | Fiber 2 | Fiber 3 |
| --- | --- | --- | --- | --- |
| Core Delta (%) | 1.0 | 1.0 | 1.0 | 1.0 |
| Core Radius (μm) | 25.0 | 25.0 | 25.0 | 25.0 |
| Trench Rt (μm) | 26.5 | 26.5 | 26.5 | 26.5 |
| Trench Width (μm) | 5.0 | 5.0 | 5.0 | 5.0 |
| Trench Delta (%) | −0.4 | −0.4 | −0.4 | −0.4 |
| $α_0$ | 2.0820 | 2.0853 | 2.0866 | 2.0880 |
| $Δα$ | 0.000 | 0.015 | 0.020 | 0.025 |
| n | 2.0 | 2.0 | 2.0 | 2.0 |

Referring to FIG. 4, a plot of alpha value versus normalized radius is shown for the Comparative Fiber and one of the exemplary radially-dependent α fibers (Fiber 2). The normalized radius is given by r/R, where r is a radial position along the radius, R, of the core region of the fiber. For the Comparative Fiber, the alpha value is held constant across the entirety of the core region. For Fiber 2, the alpha value has a ramping profile that decreases from the center of the core region to the outer radius of the core region.

Figure 5:
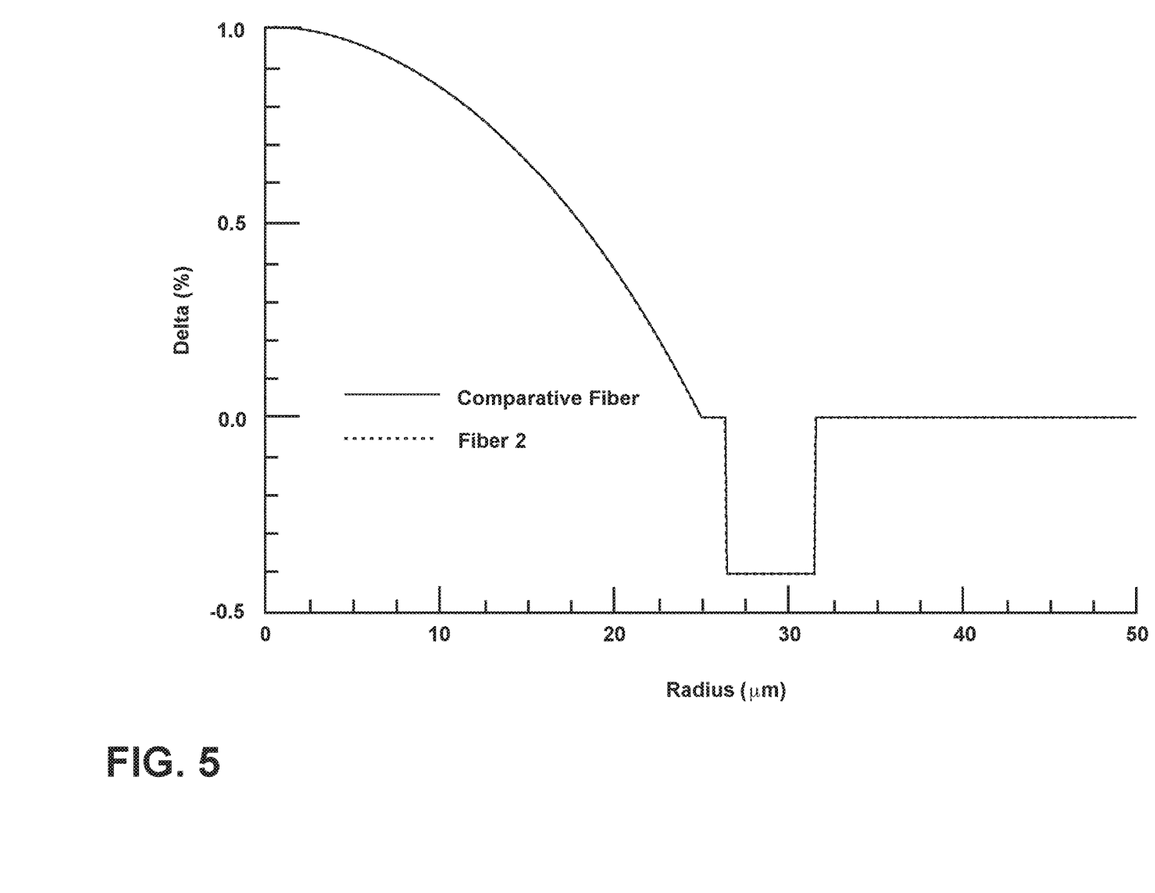

Referring now to FIG. 5, a graph depicting refractive index, delta, as a function of radius is shown for the Comparative Fiber and Fiber 2. The scale of the graph depicted in FIG. 5 shows the refractive index on a macroscale. Accordingly, the subtle differences between the refractive index profiles of the Comparative Fiber and Fiber 2 are not clearly visible and the profiles appear similar or overlapping. However, by plotting the differences in the refractive index, delta difference, of the Comparative Fiber and Fiber 2 versus radius, the differences between the profiles can be seen more clearly, as shown in FIG. 6.

Figure 6:
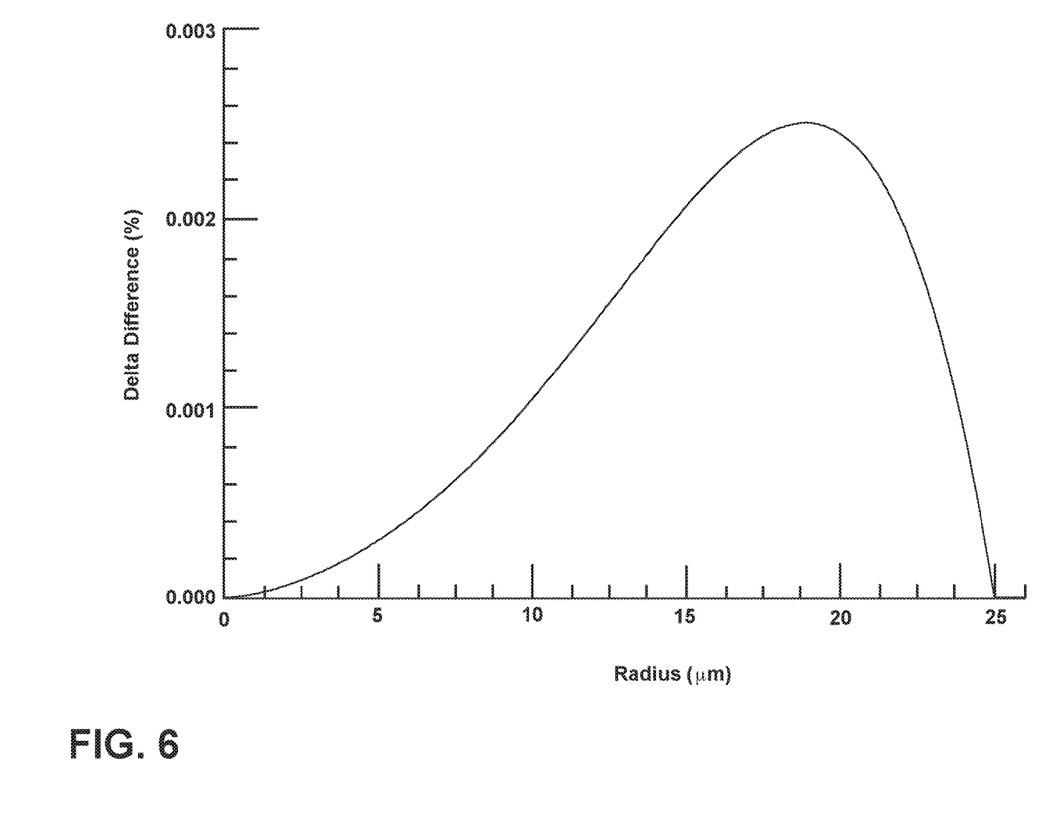

Referring to FIG. 6, the difference in the refractive index profiles of the Comparative Fiber and Fiber 2 are shown on a relevant scale as a function of radius. Although the differences between the refractive index profiles of the Comparative Fiber and Fiber 2 are subtle when viewed on the macroscale shown in FIG. 5, the differences can be more clearly seen in FIG. 6. The ramped alpha profile of the present disclosure can provide multimode optical fibers that have greater modal bandwidths, greater ease of manufacturing, greater manufacturing yield, and are capable of meeting the OM4 and OM5 standards.

It will be apparent to those skilled in the art that various modifications and variations can be made without departing from the spirit or scope of the claims.

What is claimed is:

1. A multimode optical fiber, comprising:
a core region in the fiber that comprises silica and an outer radius, R; and
a cladding that surrounds the core region and comprises silica,
wherein the core region has a refractive index profile with a radially-dependent alpha that is given by $\alpha(r)=f(r)$ and transitions from a greater alpha value, $\alpha_0$, at a center of the core region to a lesser alpha value at the outer radius in a continuous manner, and wherein a difference, $\Delta\alpha$, between the greater alpha value and the lesser alpha value is from 0.005 to 0.08.

2. The optical fiber of claim 1, wherein $f(r)=\alpha_0-\Delta\alpha(r/R)^n$, r, a radial location within the core region, is from 0 to R, and n is between about 1 and about 3.

3. The optical fiber according to claim 2, wherein n is equal to 2.

4. The optical fiber according to claim 2, wherein an average modal bandwidth of the fiber at 950 nm is at least 2.5 GHz-km.

5. The optical fiber according to claim 4, wherein a peak wavelength of the fiber is in the range of 870 nm to 900 nm.

6. The optical fiber according to claim 2, wherein an average modal bandwidth of the fiber at 850 nm is at least 4.7 GHz-km.

7. The optical fiber according to claim 2, wherein the core is doped with $GeO_2$ and the cladding is doped with fluorine.

8. The optical fiber according to claim 2, wherein the core has a relative refractive index from 0.7% to 1.3%.

9. The optical fiber according to claim 2, wherein the outer radius, R, of the core from about 14 μm to about 27 μm.

10. The optical fiber according to claim 2, wherein $\alpha_0$ is from 2.0 to 2.2 and $\Delta\alpha$ is from 0.01 to 0.04.

11. The optical fiber according to claim 2, wherein the cladding comprises a depressed region having a relative refractive index that is substantially constant and lower than a relative refractive index of the core region.

12. The optical fiber according to claim 11, wherein the cladding further comprises an inner cladding having a relative refractive index between a relative refractive index of the core region and a relative refractive index of the depressed region, and wherein the depressed region is separated from the core region by the inner cladding.

13. A multimode optical fiber, comprising:
a core region in the fiber that comprises silica and an outer radius, R; and
a cladding that surrounds the core region and comprises silica,
wherein the core region has a refractive index profile with a radially-dependent alpha that transitions from a greater alpha value, $\alpha_0$, at a center of the core region to a lesser alpha value at the outer radius in a continuous manner, and wherein a difference, $\delta$, between the greater alpha value and the lesser alpha value is from 0.005 to 0.08 and $\alpha_0$ is from 1.7 to 2.3.

14. The optical fiber according to claim 13, wherein the radially-dependent alpha is given by $\alpha(r)=2.0557+0.0263\cdot\Delta_{1max}\cdot[1-(r/R)^{\alpha_0}]+\delta$, r, a radial location within the core region, is from 0 to R, and $\Delta_{1max}$ is a peak refractive index change in the center of the core region where r=0.

15. The optical fiber according to claim 14, wherein the core is doped with $GeO_2$ and the cladding is doped with fluorine.

16. The optical fiber according to claim 14, wherein the core has a relative refractive index from 0.7% to 1.3%.

17. The optical fiber according to claim 14, wherein the cladding comprises a depressed region having a relative refractive index that is substantially constant and lower than a relative refractive index of the core region.

18. The optical fiber according to claim 17, wherein the cladding further comprises an inner cladding having a relative refractive index between a relative refractive index of the core region and a relative refractive index of the depressed region, and wherein the depressed region is separated from the core region by the inner cladding.

19. A multimode optical fiber, comprising:
a core region in the fiber that comprises silica and an outer radius, R; and
a cladding that surrounds the core region and comprises silica,
wherein the core region has a refractive index profile with a radially-dependent alpha given by $\alpha(r)=\alpha_0-\Delta\alpha(r/R)^n$, $\alpha_0$ from 1.9 to 2.3, $\Delta\alpha$ from 0.005 to 0.08, and r, a radial location within the core region, is from 0 to R, n is between about 1 and about 3.

20. The optical fiber according to claim 19, wherein an average modal bandwidth of the fiber from 850 nm to 950 nm is at least 10% greater than an average modal bandwidth of a comparative fiber from 850 nm to 950 nm, the comparative fiber comprising a core region that has a refractive index profile with a constant alpha, $\alpha$, that is approximately equal to $\alpha_0$.

21. The optical fiber according to claim 20, wherein the core region is doped with $GeO_2$ and the cladding is doped with fluorine.

22. The optical fiber according to claim 20, wherein a modal bandwidth of the fiber at 950 nm is at least 10% greater than a modal bandwidth of a comparative fiber at 950 nm, the comparative fiber comprising a core region that has a refractive index profile with a constant alpha, $\alpha$, that is approximately equal to $\alpha_0$.

23. The optical fiber according to claim 20, wherein the cladding comprises a depressed region having a relative refractive index that is substantially constant and lower than a relative refractive index of the core region.

24. The optical fiber according to claim 23, wherein the cladding further comprises an inner cladding having a relative refractive index between a relative refractive index of the core region and a relative refractive index of the depressed region, and wherein the depressed region is separated from the core region by the inner cladding.

* * * * *

UNITED STATES PATENT AND TRADEMARK OFFICE
CERTIFICATE OF CORRECTION

PATENT NO. : 10,197,726 B2
APPLICATION NO. : 16/010834
DATED : February 5, 2019
INVENTOR(S) : Xin Chen et al.

Page 1 of 1

It is certified that error appears in the above-identified patent and that said Letters Patent is hereby corrected as shown below:

On the Title Page

On page 2, Column 2, item (56), other publications, Line 15, delete "lsaer-based" and insert -- laser-based --, therefor.

Signed and Sealed this
Twenty-sixth Day of November, 2019

Andrei Iancu
*Director of the United States Patent and Trademark Office*